J. H. WOOD.
PULLING APPARATUS FOR AUTOMOBILES.
APPLICATION FILED JUNE 2, 1920.
1,388,683. Patented Aug. 23, 1921.
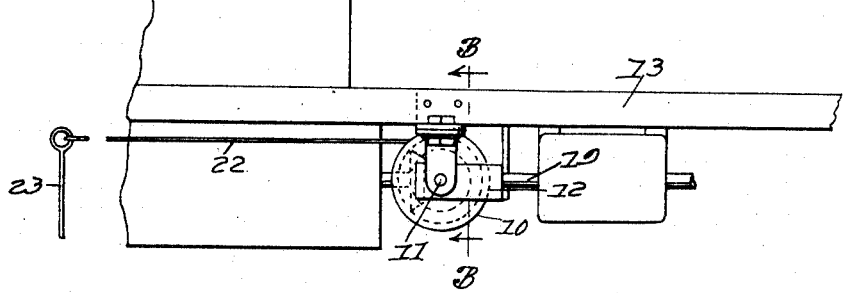
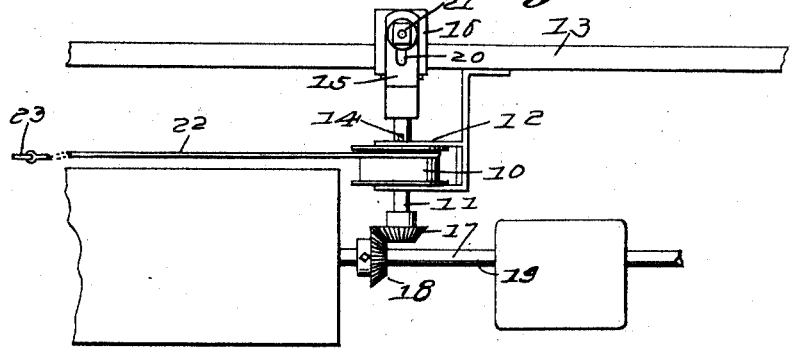
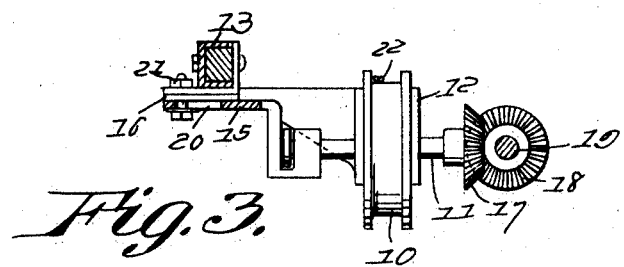
Inventor
Joseph H. Wood,
By G. Hume Talbert
Attorney

UNITED STATES PATENT OFFICE.

JOSEPH H. WOOD, OF BLANKS, LOUISIANA.

PULLING APPARATUS FOR AUTOMOBILES.

1,388,683.     Specification of Letters Patent.     Patented Aug. 23, 1921.

Application filed June 2, 1920. Serial No. 385,375.

*To all whom it may concern:*

Be it known that I, JOSEPH H. WOOD, a citizen of the United States of America, residing at Blanks, in the parish of Pointe Coupee and State of Louisiana, have invented new and useful Improvements in Pulling Apparatus for Automobiles, of which the following is a specification.

The object of the invention is to provide a simple and readily applicable means in the form of an attachment for automobiles and similar vehicles such as tractors and the like, whereby the machine may be rapidly moved over bad stretches of road or pulled out of depths of mud or from holes in which they have become stalled or mired under such conditions as to render it impossible to extricate the same through the tractive power of the drive wheels, the disposition of the pulling apparatus with reference to the driving mechanism of the motor vehicle being accomplished without loss of time or special effort upon the part of the operator and the location of the apparatus being such as to render it accessible at all times, and with these objects in view, the invention consists of a construction and combination of parts, the preferred embodiment of which is shown in the drawings, wherein:

Figure 1, is a side view of the pulling device applied in operative position to the motor vehicle.

Fig. 2, is a plan view of the same.

Fig. 3 is a rear view partly in section on the plane indicated by line 3—3 of Fig. 1.

The apparatus consists essentially of a drum 10 having a shaft 11 mounted in suitable bearings in a bracket 12 secured to a suitable element 13 of the vehicle frame, the shaft having key and slot connection as indicated at 14 with the drum to permit of axial movement of the former relative to the latter. The slot, indicated at 14 in Fig. 2 is formed in the shaft and is of materially greater length than the key which is mounted in the bore of the drum. A head 15 is connected with the shaft and mounted in a guide 16 so that by adjustment of the head the shaft may be moved to engage its terminally carried beveled gear 17 in operative relation with the bevel gear 18 which is carried by the motor drive shaft 19 of the vehicle. The head 15 may be locked in its adjusted position so that the gears 17 and 18 are held in mesh or out of mesh, according to whether the pulling apparatus is desired or not, by having a longitudinal slot 20 engaged by a locking bolt 21.

Upon the drum is a suitable cable 22 terminally attached to the stake 23 adapted to be driven into the ground at a considerable distance in advance of the vehicle; or, as will be understood, the cable may be engaged with a tree or post in a convenient position with relation to the vehicle to suit the direction of the purposed movement thereof. When the engagement of the gears 17 and 18 has been effected and the free end of the cable suitably anchored, as suggested, the engagement of the members of the clutch of the machine by the proper adjustment of the clutch lever will result in the rotation of the shaft 19 as well as the shaft 11 with the consequent rotation of the drum which, in taking up the cable, will cause the forcible advanced movement of the vehicle regardless of the inefficiency of the track wheels.

The invention having been described, what is claimed as new and useful is:—

A pulling attachment for motor vehicles having a revoluble drum, a pulling cable having one terminal attached to said drum, a drum shaft having a key and slot connection with the drum to permit relative axial movement of the same with respect to the drum, a gear couple of which one unit is attached to one terminal of said shaft and the other unit designed for attachment to the transmission shaft of the vehicle, a guide for attachment to the vehicle frame, the said drum shaft being provided with a head carried in said guide, and means for locking the head in adjusted positions in the guide for the purpose specified.

In testimony whereof I affix my signature.

JOSEPH H. WOOD.